United States Patent
Zhang

(10) Patent No.: US 10,488,983 B2
(45) Date of Patent: Nov. 26, 2019

(54) TOUCH SCREEN PANEL AND A DISPLAY DEVICE

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventor: Hao Zhang, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

( * ) Notice: Subject to any disclaimer, the term of this patent is extended or adjusted under 35 U.S.C. 154(b) by 63 days.

(21) Appl. No.: 15/229,615

(22) Filed: Aug. 5, 2016

(65) Prior Publication Data
US 2017/0269780 A1    Sep. 21, 2017

(30) Foreign Application Priority Data
Mar. 21, 2016    (CN) .......................... 2016 1 0162662

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01); *G06F 2203/04111* (2013.01)

(58) Field of Classification Search
CPC ...... G06F 3/0418; G06F 3/0412; G06F 3/044; G06F 2203/04111
(Continued)

(56) References Cited

U.S. PATENT DOCUMENTS

2010/0253646 A1* 10/2010 Hiratsuka ............... G06F 3/044
                                                                                   345/174
2016/0109997 A1    4/2016 Yu et al.
(Continued)

FOREIGN PATENT DOCUMENTS

CN        102566838 A     7/2012
CN        103389819 A    11/2013
(Continued)

OTHER PUBLICATIONS

Office Action received for Chinese Patent Application No. 201610162662.8, dated Feb. 13, 2018, 15 pages (8 pages of English Translation and 7 pages of Office Action).

*Primary Examiner* — Jennifer Mehmood
*Assistant Examiner* — Ngan T Pham Lu
(74) *Attorney, Agent, or Firm* — Womble Bond Dickinson (US) LLP

(57) ABSTRACT

This disclosure provides a touch screen panel, comprising: a plurality of first touch control electrodes extending in a first direction; a plurality of second touch control electrodes extending in a second direction intersecting with the first direction; a plurality of first wirings, one end of each first wiring being connected to a corresponding first touch control electrode, and the other end of each first wiring being connected to an integrated circuit, wherein each first wiring is located within a gap formed by the corresponding first touch control electrode and the adjacent second touch control electrode and extends along the second direction.

16 Claims, 7 Drawing Sheets

(58) Field of Classification Search
USPC .......................................................... 345/174
See application file for complete search history.

(56) References Cited

U.S. PATENT DOCUMENTS

2016/0162070 A1* 6/2016 He .......................... G06F 3/044
                                                          345/174
2016/0328035 A1    11/2016 Zou

FOREIGN PATENT DOCUMENTS

| CN | 104317445 A | 1/2015 |
| CN | 104407758 A | 3/2015 |
| CN | 104461135 A | 3/2015 |
| CN | 204965393 U | 1/2016 |

* cited by examiner

TOUCH SCREEN PANEL AND A DISPLAY DEVICE

RELATED APPLICATIONS

The present application claims the benefit of Chinese Patent Application No. 201610162662.8, filed Mar. 21, 2016, the entire disclosure of which is incorporated herein by reference.

FIELD

This disclosure relates to the field of display technology, particularly to a touch screen panel and a display device.

BACKGROUND

The touch screen panel (TSP) is a new-type input device, which provides a simple, convenient and natural human-machine interaction mode. It has been widely applied in various multimedia interaction devices currently.

FIG. 1 is a structural schematic view of an existing on-cell type touch screen panel. As shown in FIG. 1, a plurality of first touch control electrodes 11 and a plurality of touch control electrodes 12 overlapping with the first touch control electrodes 11 are arranged in a touch control area SS (the area as shown by the dotted line block in the figure) of the panel. Normally, the first touch control electrode 11 is connected to an integrated circuit IC through a first wiring 13 arranged outside the touch control area SS. The first wiring 13 can be led out from any end of the first touch control electrode 11, and connected to the integrated circuit IC via a border area (an area outside the touch control area SS). The second touch control electrode 12 is connected to the IC through a second wiring 14 arranged outside the touch control area SS. Second wirings 14 can be led out from each of the two ends of the second touch control electrode 12, and are connected to the integrated circuit IC via the border area respectively.

However, with the improvement of the TSP accuracy, the number of the touch control electrodes in the touch control area SS will be increased. Correspondingly, the number of the wirings connected with the touch control electrodes will also be increased; thereby, the area for arranging the wirings can be only increased by increasing the border area. Therefore, it is not benefit for achieving the design effect of a narrow border.

SUMMARY

Embodiments of this disclosure provide a touch screen panel and a display device for solving the problem of a relatively large border area caused by peripheral wirings connected with touch control electrodes of the touch screen panel in the prior art.

According to one aspect of this disclosure, a touch screen panel is provided, comprising: a plurality of first touch control electrodes extending in a first direction; a plurality of second touch control electrodes extending in a second direction intersecting with the first direction; a plurality of first wirings, one end of each first wiring being connected to a corresponding first touch control electrode, and the other end of each first wiring being connected to an integrated circuit, wherein each first wiring is located within a gap formed by the corresponding first touch control electrode and the adjacent second touch control electrode and extends along the second direction.

According to an embodiment of the this disclosure, the wiring connected to the touch control electrode is arranged in the touch control area and is located within a gap between the touch control electrodes, so as to avoid the problem of a relatively large border area caused by arranging the wiring in the border area.

According to an embodiment of this disclosure, the touch panel may further comprise: at least two isolation lines within the gap formed by the first touch control electrode and the adjacent second touch control electrode, wherein the first wiring is located between two isolation lines within the gap where it locates and is insulated from the isolation lines.

According to an embodiment of this disclosure, the isolation lines can avoid mutual interference between the first wiring and the touch control electrode.

According to an embodiment of this disclosure, the touch panel may further comprise: a plurality of second wirings, one end of each second wiring being connected to a corresponding second touch control electrode, and the other end of each second wiring being connected to an integrated circuit, wherein each second wiring is located within a gap formed by the corresponding second touch control electrode and the adjacent first touch control electrode and extends along the second direction.

According to an embodiment of this disclosure, the second wiring is arranged in the touch control area so as to avoid the problem of a relatively large border area caused by arranging the second wiring connected to the second touch control electrode in the border area.

According to an embodiment of this disclosure, the second wiring can be located between two isolation lines within the gap where it locates and be insulated from the isolation lines.

According to an embodiment of this disclosure, the isolation lines can avoid mutual interference between the second wiring and the touch control electrode.

According to an embodiment of this disclosure, the first wiring and the second wiring can be located within different gaps.

According to an embodiment of this disclosure, mutual interference between the first wiring and the second wiring can be avoided.

According to an embodiment of this disclosure, the first wiring and the second wiring can be arranged at intervals along the first direction.

According to an embodiment of this disclosure, arranging the first wiring and the second wiring at intervals can avoid mutual interference caused by the distance between the wirings being too close.

According to an embodiment of this disclosure, a distance from one end of each of the plurality of the first wiring connected to the corresponding first touch control electrode to the integrated circuit can increase or decrease in sequence in the first direction.

According to an embodiment of this disclosure, the wiring mode can be optimized and mutual interference between the wirings can be avoided.

According to an embodiment of this disclosure, an electrode pattern of the first touch control electrode and the second touch control electrode can include one of the following shapes: diamond, triangle and strip.

According to an embodiment of this disclosure, wirings of different shapes can be formed based on different electrode patterns.

According to an embodiment of this disclosure, materials of the first wiring and the second wiring may include transparent oxides.

According to an embodiment of this disclosure, forming the first wiring and the second wiring through the transparent oxides can avoid influence on transmittance.

According to the other aspect of this disclosure, a display device is provided, comprising the touch screen panel according to this disclosure.

According to embodiments of this disclosure, the wiring connected to the touch control electrode is arranged in the touch control area and is located within a gap between the touch control electrodes, so as to avoid the problem of a relatively large border area caused by arranging the wiring in the border area.

BRIEF DESCRIPTION OF THE DRAWINGS

In order to explain the embodiments of this disclosure more clearly, the drawings for describing the embodiments will be introduced briefly next. Apparently, the drawings described below only show some embodiments of this disclosure. For the ordinary skilled person in the art, on the premise of not paying any creative work, various modifications and variations can also be made to the embodiments as shown in these drawings without departing from the teaching of this disclosure. In the drawings.

DETAILED DESCRIPTION

In order to make the purposes, the technical solutions and the advantages of this disclosure clearer, this disclosure will be described in more detail with reference to the drawings below. Apparently, the embodiments described are only a part of rather than all of the embodiments of this disclosure. Based on the embodiments of this disclosure, all of other implementations obtained by the ordinary skilled person in the art without any creative work should belong to the claimed scope of this disclosure.

According to an embodiment of this disclosure, by changing the position of the wiring connected to the first touch control electrode, the wiring that is originally located in the border area is arranged in the touch control area of the touch screen panel, and the wiring arranged in the touch control area is located within a gap formed by adjacent touch control electrodes, thereby avoiding the wiring connected to the first touch control electrode from occupying the border area, so as to realize narrow border design. Further, by changing the position of the wiring connected to the second touch control electrode, the wiring that is originally located within the border area is arranged in the touch control area of the touch control panel, and the wiring arranged in the touch control area is located within a gap formed by adjacent touch control electrodes, thereby avoiding the wiring connected to the second touch control electrode from occupying the border area, so as to realize the narrow border design more effectively.

Next, this disclosure will be described in detail through respective embodiments. However, it should be realized that the implementations of this disclosure are not limited to the following embodiments.

Figure 2:
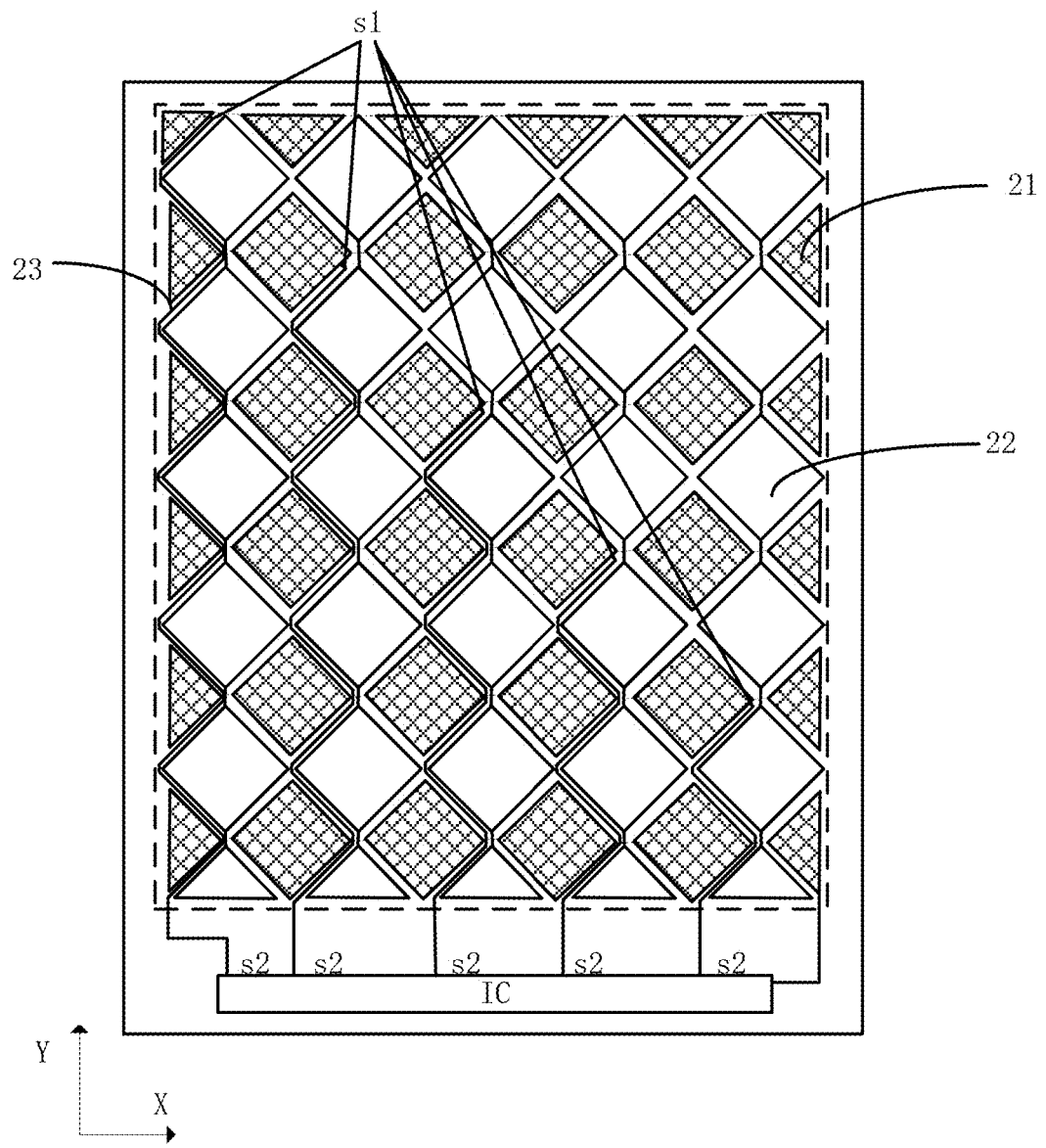
FIG. 2 is a structural schematic view of a touch screen panel according to an embodiment of this disclosure.

FIG. 2 is a structural schematic view of a touch screen panel according to an embodiment of this disclosure.

As shown in FIG. 2, the touch screen panel according to an embodiment of this disclosure may comprise: a plurality of first touch control electrodes 21 extending in a first direction X; a plurality of second touch control electrodes 22 extending in a second direction Y intersecting with the first direction X; a plurality of first wirings 23, one end s1 of each first wiring 23 being connected to a corresponding first touch control electrode 21, and the other end s2 of each first wiring 23 being connected to an integrated circuit IC. Each first wiring 23 is located within a gap formed by the corresponding first touch control electrode 21 and the adjacent second touch control electrode 22 and extends along the second direction Y.

Referring to FIG. 2, the electrode pattern of the first touch control electrode 21 and the second touch control electrode 22 of the touch screen panel can be a diamond, and the end s1 of the first wiring 23 is connected with the first touch control electrode 21.

Figure 3A:
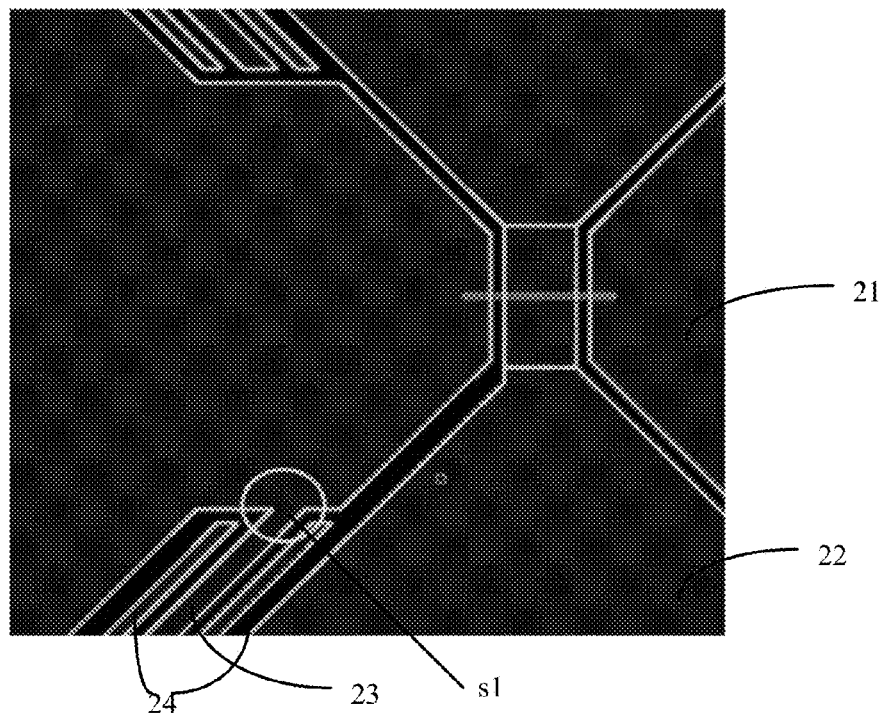
FIG. 3A is an amplified schematic view of a connecting position of a first wiring and a first touch control electrode in the touch screen panel according to an embodiment of this disclosure.

FIG. 3A is an amplified schematic view of a connecting position of a first wiring and a first touch control electrode in the touch screen panel according to an embodiment of this disclosure.

Referring to FIG. 3A, the first wiring 23 can be led out from any position of the first touch control electrode 21. For example, the first wiring 23 can be led out from any bevel edge position of the electrode pattern of the first touch control electrode 21. As shown in FIG. 3A, the first wiring 23 can be led out from the bevel edge position at the lower right of the first touch control electrode 21 having a diamond electrode pattern. As shown in the figure, the first touch control electrode 21 and the first wiring 23 are located in the same layer, and have different line widths.

Figure 3B:
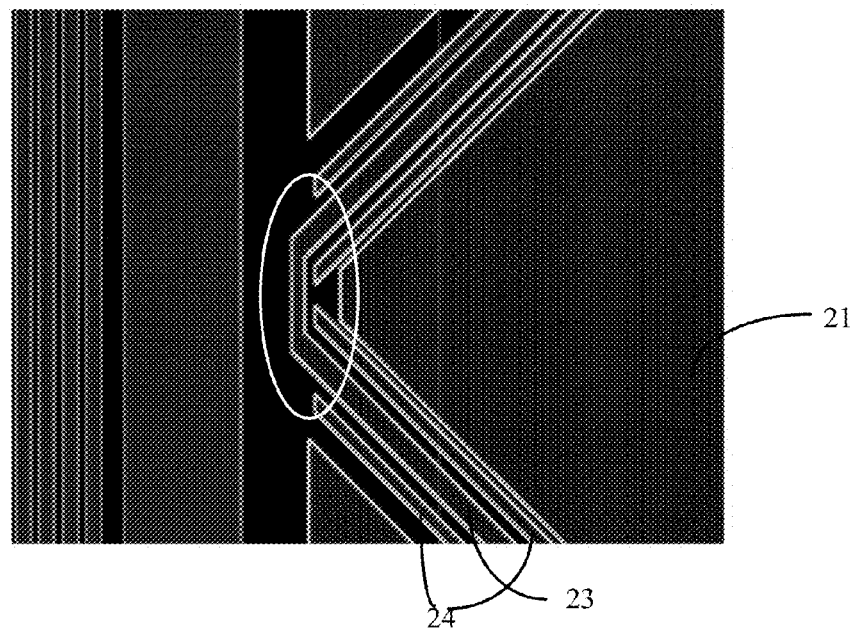
FIG. 3B and FIG. 3C are amplified schematic views of the first wiring and the first touch control electrode at a gap corner position in the touch screen panel according to an embodiment of this disclosure.
Figure 3C:
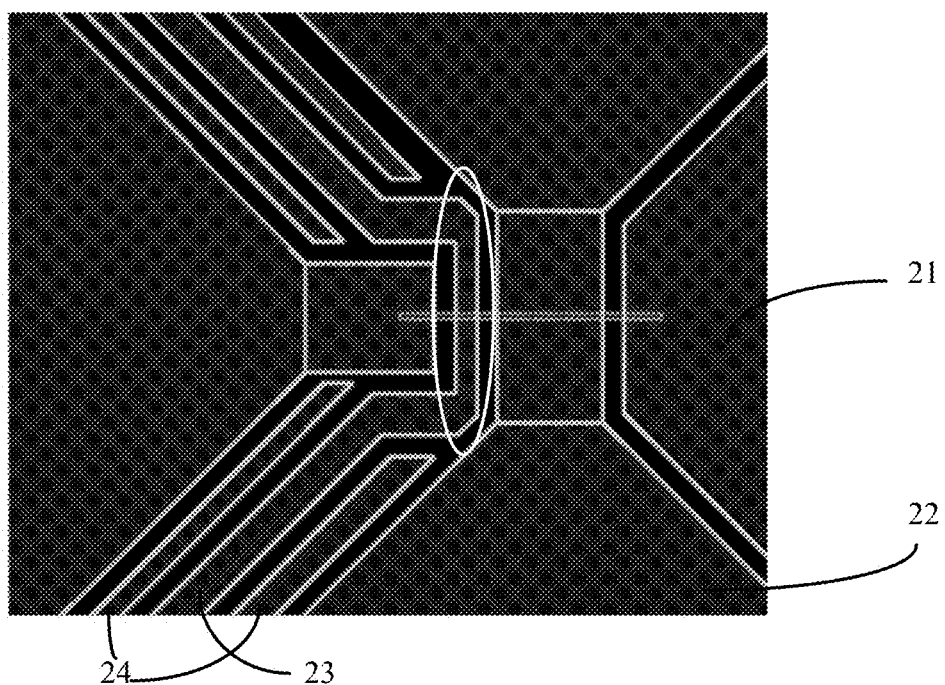

FIG. 3B and FIG. 3C are amplified schematic views of the first wiring and the first touch control electrode in the touch screen panel at the gap corner positions according to an embodiment of this disclosure.

Referring to FIG. 3B and FIG. 3C, the first wiring 23 extends along the gap where it locates, and its extending direction is the same as that of the second touch control electrode 22 (i.e., the second direction Y). At the corner position, the first wiring 23 can have a broken line corner as shown in FIG. 3B, which can also be a circular arc corner. In addition, as shown in FIG. 3C, at the corner position, the adjacent electrode patterns are connected with each other through a bridge structure. Hence, the first wiring 23 and the bridge structure overlap in a direction perpendicular to the touch screen panel and are insulated from each other. The corner shape of the first wiring 23 can be designed based on the specific gap pattern.

Figure 1:
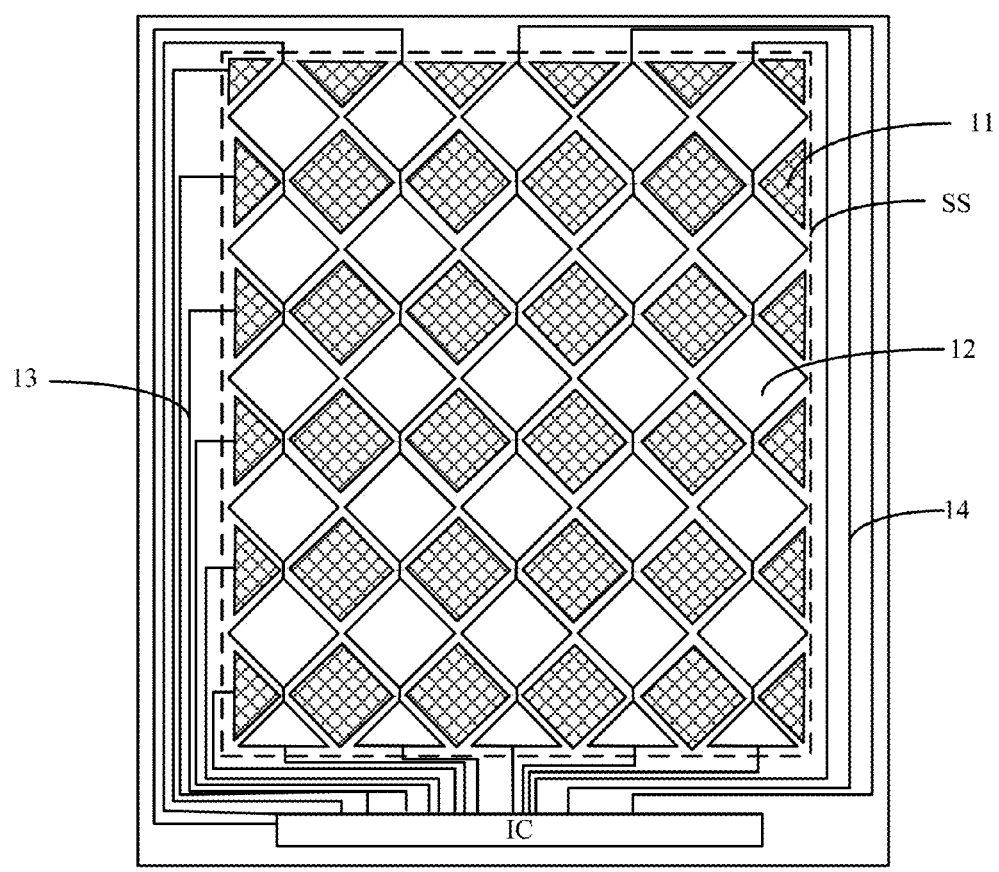
FIG. 1 is a structural schematic view of an existing on-cell type touch screen panel.

In addition, for the convenience of describing, FIG. 2 only shows the first wiring 23 connected to the first touch control electrode 21, without showing the second wiring connected to the second touch control electrode 22. According to an embodiment of this disclosure, the second wiring connected to the second touch control electrode 22 can have the same arranging manner as the second wiring 14 as shown in FIG. 1.

By means of the first wiring in the above solution, it can not only ensure that the first touch control electrode 21 can obtain normal signals through the first wiring 23 but also avoid increasing the border area by arranging the first wiring 23 in the border area, thereby achieving the design of a narrow border.

According to an embodiment of this disclosure, as shown in FIG. 3A to FIG. 3C, the touch screen panel may further comprise: at least two isolation lines 24 located within a gap formed by the first touch control electrode 21 and the adjacent second touch control electrode 22. The first wiring 23 can be located between two isolation lines 24 within the gap where it locates and be insulated from the isolation lines 24. The isolation line 24 can be a completely independent lead and not used for receiving any signal and/or voltage. The isolation line 24 can be used for isolating signal interference between the first wiring 23 and the first touch control electrode 21 or between the first wiring 23 and the second touch control electrode 22.

Figure 4:
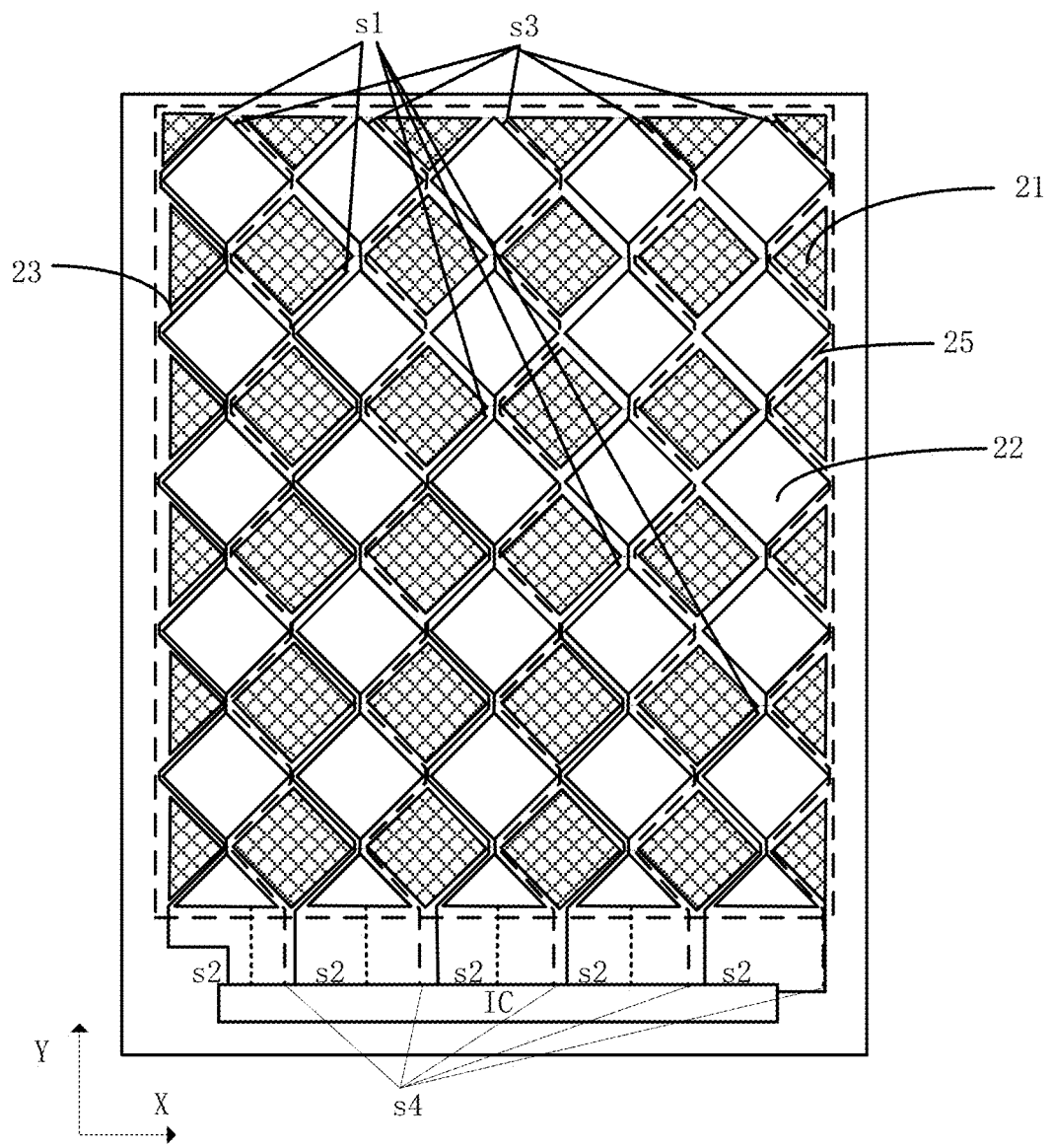
FIG. 4 is a structural schematic view of a touch screen panel according to another embodiment of this disclosure.

FIG. 4 is a structural schematic view of a touch screen panel according to another embodiment of this disclosure.

As shown in FIG. 4, the touch screen panel according to another embodiment of this disclosure may further comprises: a plurality of second wirings 25 (as shown by the dotted line), one end s3 of each second wiring 25 being connected to a corresponding second touch control electrode 22, and the other end s4 of each second wiring 25 being connected to an integrated circuit IC. Each second wiring 25 can be located within a gap formed by the corresponding second touch control electrode and the adjacent first touch control electrode, and extends along a second direction Y.

According to an embodiment of this disclosure, the second wiring 25 can be located between two isolation lines 24 within the gap where it locates and insulated from the isolation line 24, thereby avoiding signal interference between the second wiring 25 and the first touch control electrode 21 or the second touch control electrode 22.

According to an embodiment of this disclosure, in order to avoid mutual interference between the first wiring 23 and the second wiring 25, as shown in FIG. 4, the first wiring 23 and the second wiring 25 can be located within different gaps.

The first wiring and the second wiring can be arranged at intervals along the first direction.

In addition, in order to avoid the distance between the same type of wirings being too close, as shown in FIG. 4, the first wiring 23 and the second wiring 25 are arranged at intervals along the first direction X. The first touch control electrode 21 extends in the first direction X, the second touch control electrode 22 extends in the second direction Y, and the first touch control electrodes 21 are connected with each other in the overlapping area through a bridge structure. The first wiring 23 connected to the first row of the first touch control electrodes 21 extends along the gap at the utmost left in the figure in the second direction Y to the integrated circuit IC. The first wiring 23 connected to the second row of the first touch control electrodes 21 should avoid to be adjacent to the first wiring 23 connected to the first row of the first touch control electrodes 21. Hence, the first wiring 23 connected to the second row of the first touch control electrodes 21 can extend along the third gap from the left in the figure in the second direction to the integrated circuit IC. The second gap from the left in the figure can be used for arranging the second wiring 25 connected to the first column of the second touch control electrodes 22, and so on. Through reasonable wiring, mutual interference between the same type of wirings can be avoided.

According to an embodiment of this disclosure, as shown in FIG. 4, a distance from one end s1 of each first wiring 23 connected to the corresponding first touch control electrode 21 to the integrated circuit IC can decrease in sequence in the first direction X. However, this disclosure is not limited to this. A distance from one end s1 of each first wiring 23 connected to the corresponding first touch control electrode 21 to the integrated circuit IC can increase in sequence in the first direction X.

It should be noted that in the embodiments of this disclosure, it is considered that the length of the touch control panel in the first direction X is less than the length in the second direction Y. Hence, the two ends of the second touch control electrode 22 are both connected with wirings normally, where the end close to the integrated circuit IC can be directly connected to the integrated circuit IC through a general wiring, while the end away from the integrated circuit IC is connected to the IC through the second wiring 25. Meanwhile, arranging the first wiring 23 and the second wiring 25 in the touch control area of the touch screen panel can reduce the border area of the touch screen panel to the greatest extent.

Figure 5A:
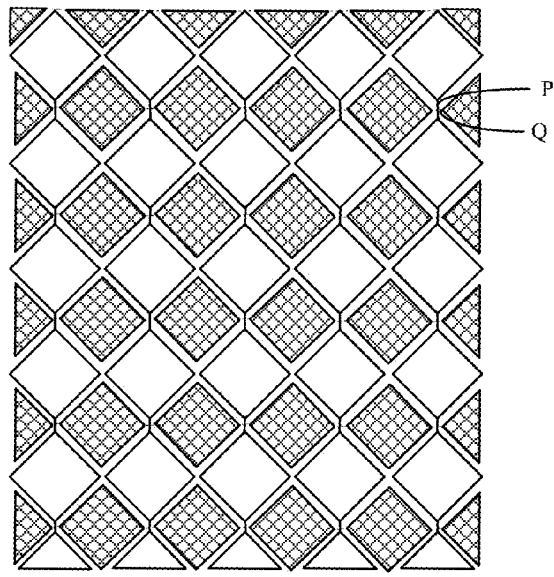
FIG. 5A to FIG. 5C are schematic views that show electrode patterns for use in the touch control electrodes in the touch panel according to an embodiment of this disclosure.
Figure 5B:
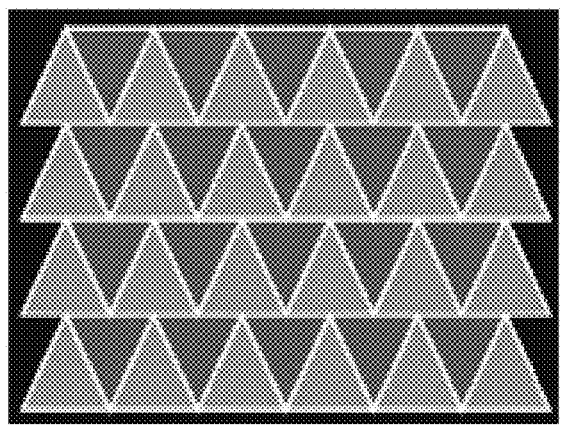
Figure 5C:
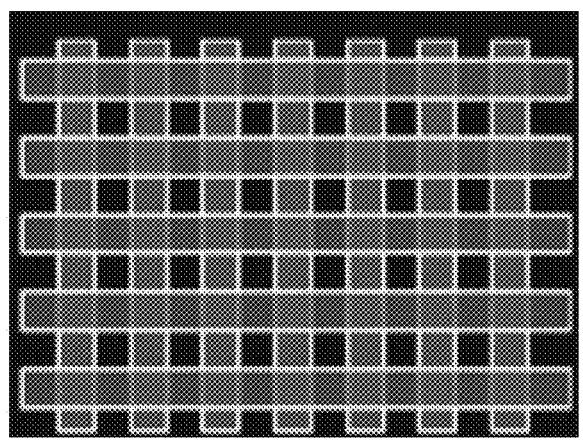

According to an embodiment of this disclosure, the electrode pattern of the first touch control electrode 21 and the second touch control electrode 22 include one of the following shapes: diamond, triangle and strip. FIG. 5A to FIG. 5C are schematic views that show electrode patterns for use in the touch control electrodes in the touch panel according to an embodiment of this disclosure.

As shown in FIG. 5A, the electrode patterns of the first touch control electrode and the second touch control electrode are both diamond, and each diamond pattern in the first touch control electrode is connected with each other through a bridge structure Q arranged in another layer, while each of the diamond patterns in the second touch control electrode is connected with each other through a connecting structure P arranged in the same layer.

As shown in FIG. 5B and FIG. 5C, the electrode pattern of the first touch control electrode and the second touch control electrode can be a triangle or a strip, the specific connecting manner of which can be set based on touch control requirements. A gap is arranged between each first touch control electrode and second touch control electrode for arranging the first wiring or the second wiring.

According to an embodiment of this disclosure, the materials of the first wiring 23 and the second wiring 25 can comprise a transparent oxide. For example, the materials of the first wiring 23 and the second wiring 25 can comprise indium tin oxide (ITO).

Figure 6:
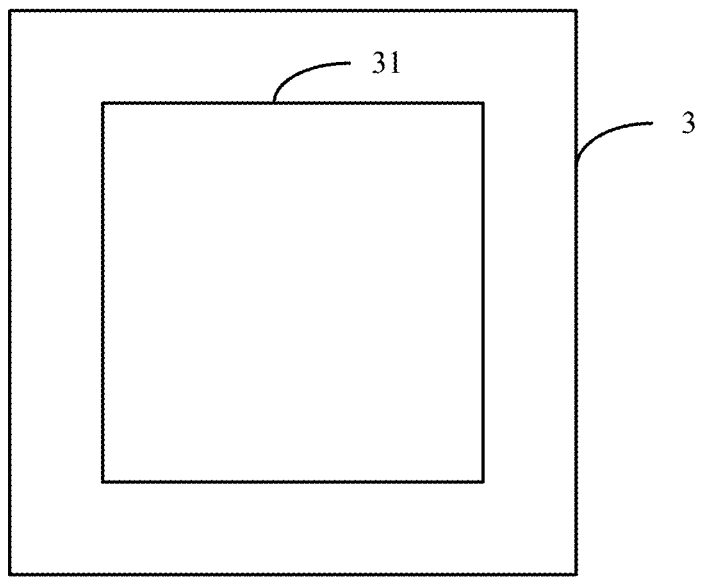
FIG. 6 is a structural schematic view of a display device according to an embodiment of this disclosure.

FIG. 6 is a structural schematic view of a display device according to an embodiment of this disclosure.

As shown in FIG. 6, a display device 3 according to an embodiment of this disclosure can comprise a touch screen panel 31 according to embodiments of this disclosure. The display device 3 can comprise (but not limited to) any product or component with the touch display function such as a mobile phone, a tablet, a television, a display, a laptop, a digital photo frame, a navigator and so on.

Although preferred embodiments of this disclosure have been described, once the skilled person in the art knows the basic inventive concept, additional modifications and variations can be made to these embodiments. So, the attached claims intend to be construed as including the preferred embodiments and all variations and modifications falling within the scope of this disclosure.

Apparently, the skilled person in the art can make various modifications and variations to the present disclosure without departing from the spirit and the scope of the present disclosure. In this way, provided that these modifications and variations of the present disclosure belong to the scopes of the claims of the present disclosure and equivalent technologies thereof, the present disclosure also intends to encompass these modifications and variations.

The invention claimed is:

1. A touch screen panel, comprising:
a plurality of lines of first touch control electrode extending in a first direction, each line of first touch control electrode comprising a plurality of first touch control electrode elements connected with each other;
a plurality of lines of second touch control electrode extending in a second direction intersecting with the first direction, each line of second touch control electrode comprising a plurality of second touch control electrode elements connected with each other;
a plurality of first wirings, each first wiring corresponding to one line of first touch control electrode, one end of each first wiring being connected to one first touch control electrode element of the corresponding line of first touch control electrode, and the other end of each first wiring being connected to an integrated circuit, and only one first touch control electrode element of the one line of first touch control electrode being connected to the integrated circuit through a corresponding first wiring,
wherein each first wiring is located within a gap formed by the corresponding first touch control electrode element and the adjacent second touch control electrode element and extends along the second direction,
the touch screen panel further comprising:
at least two isolation lines within the gap formed by the first touch control electrode element and the adjacent second touch control electrode element,
wherein the first wiring is located between two isolation lines within the gap where the first siring is located and is insulated from the isolation lines.

2. The touch screen panel according to claim 1, further comprising:
a plurality of second wirings, each second wiring corresponding to one line of second touch control electrode, one end of each second wiring being connected to one second touch control electrode element of the corresponding line of second touch control electrode, and the other end of each second wiring is connected to an integrated circuit,
wherein each second wiring is located within a gap formed by the corresponding second touch control electrode element and the adjacent first touch control electrode element and extends along the second direction.

3. The touch screen panel according to claim 2, wherein the second wiring is located between two isolation lines within the gap where it locates and is insulated from the isolation lines.

4. The touch screen panel according to claim 2, wherein the first wiring and the second wiring are located within different gaps.

5. The touch screen panel according to claim 4, wherein the first wiring and the second wiring are arranged at intervals along the first direction.

6. The touch screen panel according to claim 2, wherein materials of the first wiring and the second wiring include transparent oxides.

7. The touch screen panel according to claim 1, wherein a distance from one end of each of the plurality of the first wirings connected to the corresponding line of first touch control electrode to the integrated circuit increases or decreases in sequence in the first direction.

8. The touch screen panel according to claim 1, wherein an electrode pattern of the first touch control electrode element and the second touch control electrode element include one of the following shapes: diamond, triangle and strip.

9. A display device, comprising the touch screen panel according to claim 1.

10. The display device according to claim 9, wherein the touch screen panel further comprises:
a plurality of second wirings, each second wiring corresponding to one line of second touch control electrode, one end of each second wiring being connected to one second touch control electrode element of the corresponding line of second touch control electrode, and the other end of each second wiring is connected to an integrated circuit,
wherein each second wiring is located within a gap formed by the first touch control electrode element and the adjacent second touch control electrode element and extends along the second direction.

11. The display device according to claim 10, wherein the second wiring is located between two isolation lines within the gap where it locates and is insulated from the isolation lines.

12. The display device according to claim 10, wherein the first wiring and the second wiring are located within different gaps.

13. The display device according to claim 12, wherein the first wiring and the second wiring are arranged at intervals along the first direction.

14. The display device according to claim 9, wherein a distance from one end of each of the plurality of first wiring connected to the corresponding line of first touch control electrode to the integrated circuit increases or decreases in sequence in the first direction.

15. The display device according to claim 9, wherein an electrode pattern of the first touch control electrode element and the second touch control electrode element include one of the following shapes: diamond, triangle and strip.

16. The display device according to claim 10, wherein materials of the first wiring and the second wiring include transparent oxides.

* * * * *